May 28, 1957 R. CUCHET 2,793,573
CAMERA RELEASE GRIP
Filed March 6, 1956 4 Sheets-Sheet 1

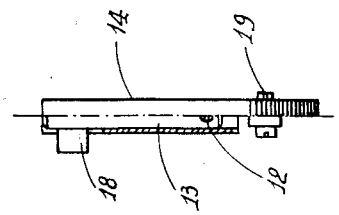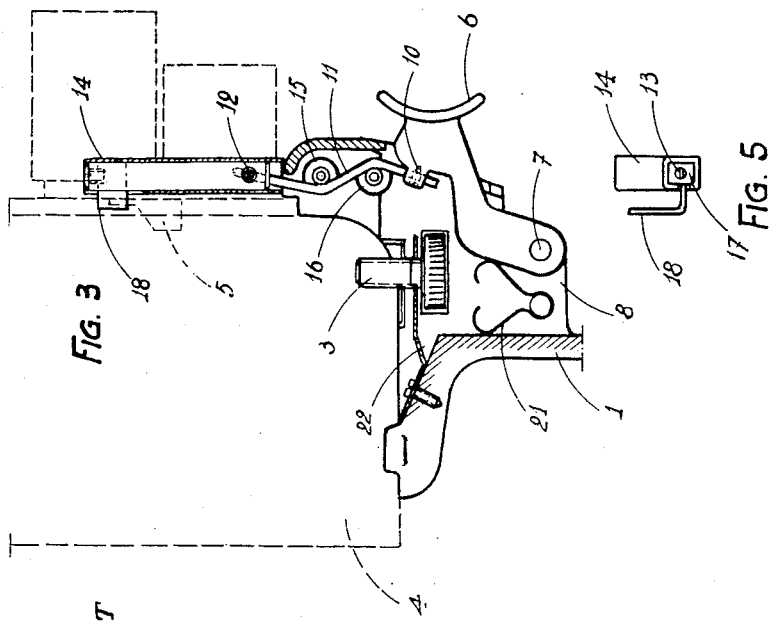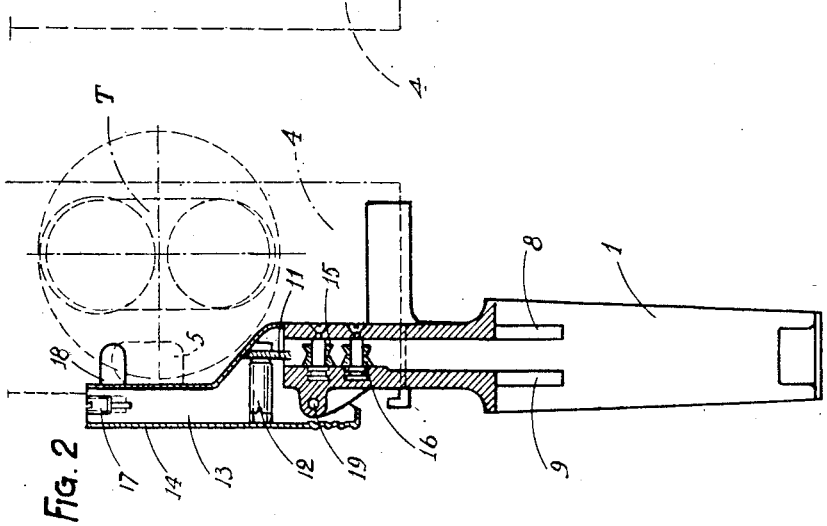

May 28, 1957 R. CUCHET 2,793,573
CAMERA RELEASE GRIP
Filed March 6, 1956
4 Sheets-Sheet 3
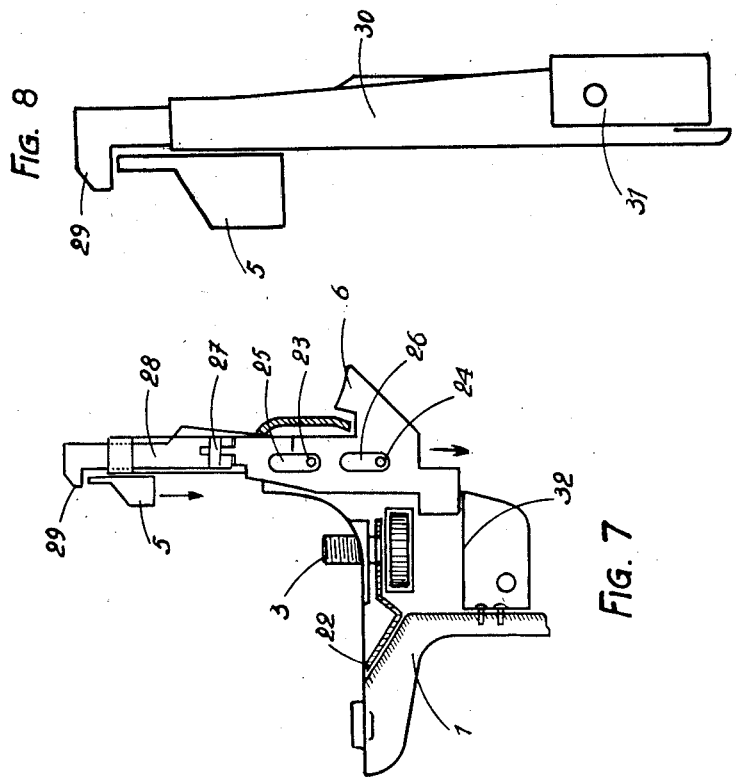
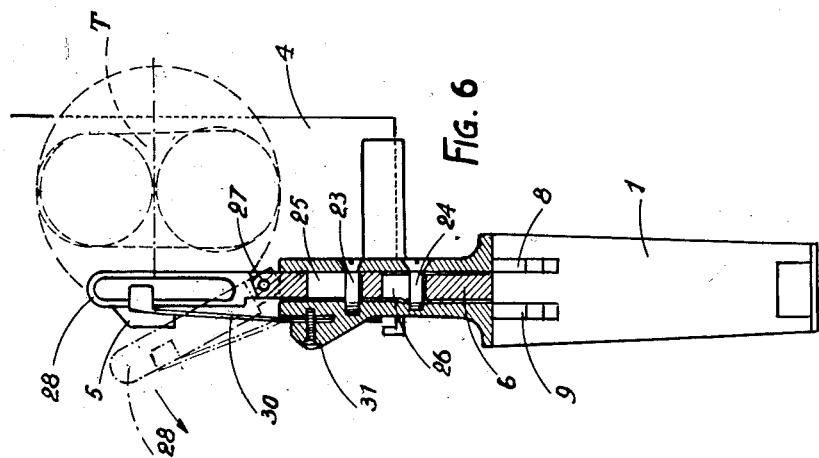

May 28, 1957 R. CUCHET 2,793,573
CAMERA RELEASE GRIP
Filed March 6, 1956
4 Sheets-Sheet 4
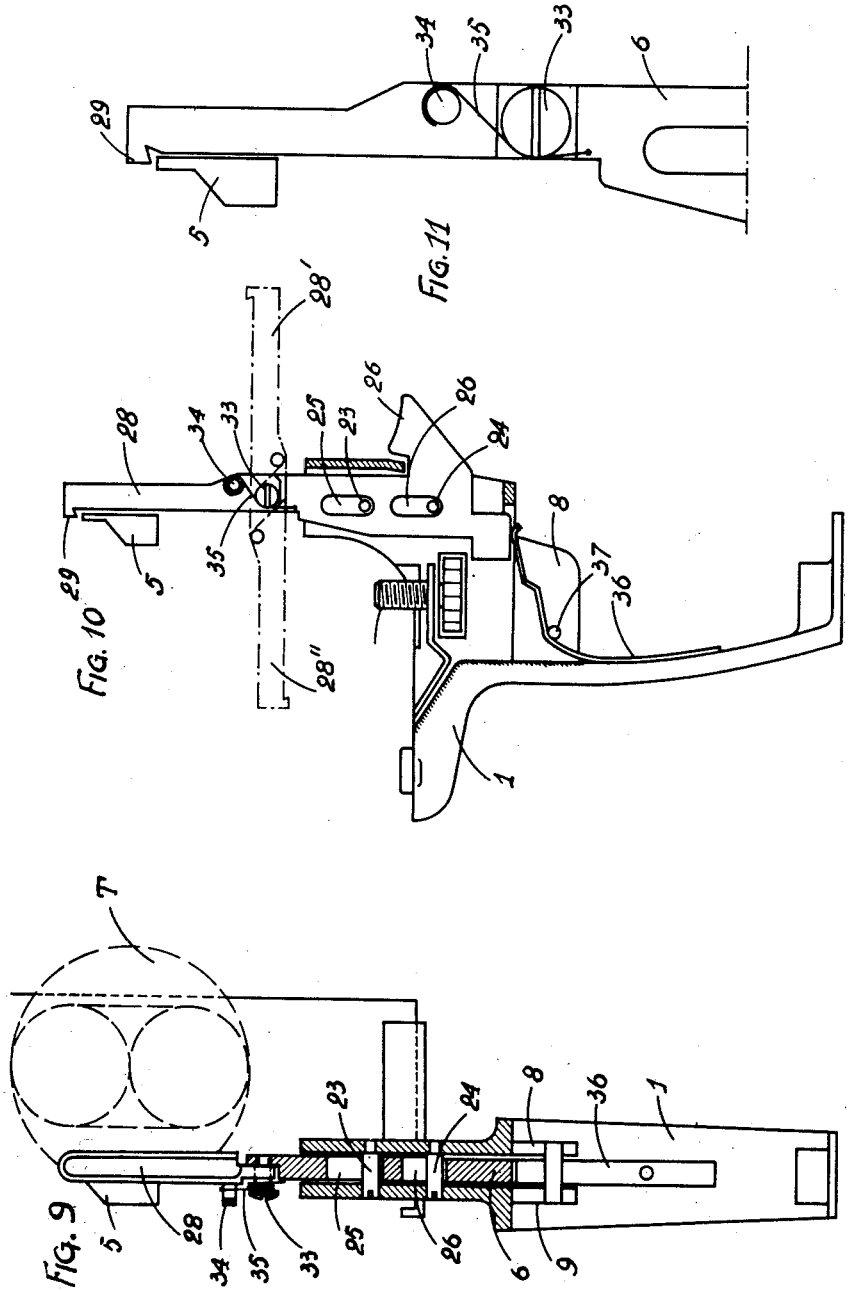

United States Patent Office 2,793,573
Patented May 28, 1957

2,793,573

CAMERA RELEASE GRIP

Roger Cuchet, Nancy, France

Application March 6, 1956, Serial No. 569,793

Claims priority, application France March 26, 1955

12 Claims. (Cl. 95—53)

The present invention relates to a release grip for a camera.

The invention has for its object the provision of a release grip of the kind comprising a grip-shaped member on which the camera is removably mounted, said grip being provided with a trigger mechanism acting on the camera release and adapted to be actuated by the operator with one finger of the hand with which he is holding the grip.

Another object of the invention is the provision of such a release grip particularly designed for cameras equipped with a shutter release mounted for vertical movement on the side of the front face of the camera, upon which a multi-objective rotatable turret is provided.

Further features and advantages of the invention will appear from the ensuing description with reference to the accompanying drawings, which illustrate diagrammatically and merely by way of example, three forms of embodiment of the release grip.

On the drawings:

Fig. 2 is a sectional view substantially on line II—II of Fig. 1.

Fig. 3 is a side view, partly in section, corresponding to that of Fig. 2.

Fig. 4 is a detail view half in elevation and half in section illustrating the cage in which the finger-carrying slider is mounted.

Fig. 5 is a plan view corresponding to that of Fig. 4.

Fig. 6 is a view similar to that of Fig. 2, illustrating a modified embodiment of the release grip.

Fig. 7 is a side view partly in section corresponding to that of Fig. 6.

Fig. 8 is a detail view illustrating in elevation the finger carrying support.

Fig. 9 is a view similar to that of Fig. 2, illustrating a modified embodiment of the release grip according to Figs. 6 and 8.

Fig. 10 is a side view partly in section, corresponding to that of Fig. 9.

Fig. 11 is a detail view illustrating the finger carrying support in elevation.

Figure 1:
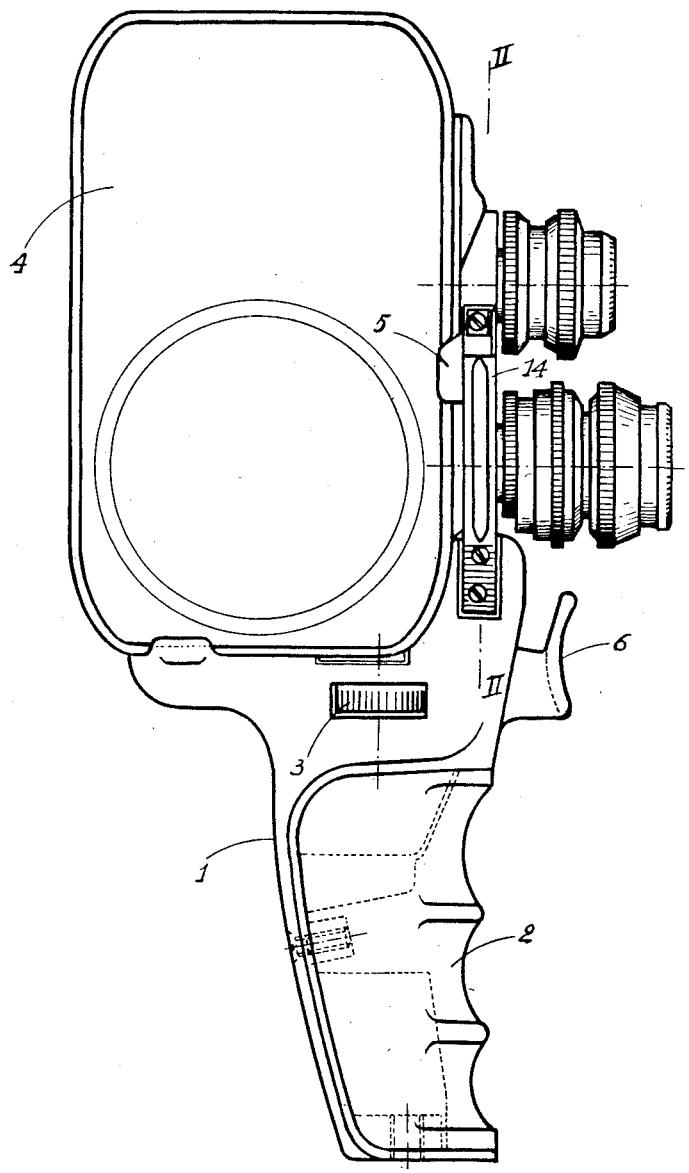
Fig. 1 is an elevational view of the release grip on which a camera is mounted.

In the accompanying drawings, the grip proper comprises, in known fashion, a bracket 1, preferably of cast metal, having attached to it a part 2, preferably of plastic material, formed as a grip. Also provided on bracket 1 in known manner is a screw 3 serving to mount a camera, generally designated 4, provided with a release member 5 mounted for vertical movement on the front face of the camera which is equipped with a rotatable turret T having a plurality of objectives, e. g. two.

In the exemplary construction shown in Figs. 2 to 5, the release grip includes a trigger 6 pivotally mounted on a pin 7 interconnecting the two flanges 8 and 9 of the supporting member 1. Secured on the trigger 6 for adjustment with a screw 10, is one end of a flexible cable 11 the other end of which is secured for adjustment by means of a screw 12, on a slider 13 slidably mounted within a cage 14.

As shown, the flexible cable 11 passes over two pivoted rollers 15, 16 secured on the bracket 1 by means of two screws.

Mounted on the upper end of slider 13 by means of a screw 17 is a claw 18 adapted to engage with the release 5 of the camera.

In order that the slider 13 may move in the cage 14, the latter is formed with a slot through which the claw 18 projects outside the cage 14.

Furthermore, in order that claw 18 may be conveniently brought into engagement with the camera release 5, and so that the turret T of the camera may be rotated, the cage 14 with the components contained in it, is pivotally mounted on the pine 19 serving to secure it to the support 1.

The release grip is completed by a return spring 21 disposed between the bracket 1 and trigger 6, and a strip 22 adapted to engage with screw 3 so as to prevent any lateral slippage.

The claw 18 being in engagement with the release 5, when the trigger 6 is depressed with a finger, the trigger is rocked about pin 7, and, through the cable 11, causes the slider 13 to move down in the cage 14. The claw 18 being integrally connected with slider 13, this results in actuating the release lever 5.

When pressure on trigger 6 is relieved, the trigger returns to its idle position under the action of spring 21, and claw 18 as it moves up again allows release lever 5 to return of its own accord to its initial position.

In the exemplary construction illustrated in Figs. 6 to 8, the trigger 6, instead of being pivotally mounted, is slidably mounted on the bracket 1 of the grip, being guided by means of two screws 23 and 24 which interconnect the flanges 8 and 9 of said bracket and extend through two oblong apertures 25 and 26 respectively formed in the body of the trigger.

Directly pivoted on the upper end of the body of trigger 6 with a pin 27 is a support 28 provided at its free end with a claw 29 held in engagement with the camera release 5 by means of a return spring 30 secured to a boss 31 integral with the support 1. The grip is completed by the provision of a right-angled return spring 32 acting on the trigger 6 (see Fig. 7).

When the trigger 6 is pressed in the direction indicated by the arrow in Fig. 7, the claw 29 acts on the camera release 5 in opposition to the action of return spring 32 which automatically restores the trigger 6 to its idle position when the action on it is relieved.

The support 28 carrying the claw 29 being pivotally mounted on the shaft 27, it will be understood that said bracket may be shifted from the position in which it is shown in full lines in Fig. 1 to that shown in chain lines in the same figure, so as to allow the turret T to be rotated for changing lenses.

In the case of Figs. 9 to 11 which illustrate a modified embodiment of the release grip described with reference to Figs. 6 to 8, the claw-carrying support 28 is pivotally mounted at the upper end of the body of the trigger 6, by means of a pin 33 perpendicular to the trigger 6 and mounted thereon for free rotation. Moreover the support 28 is provided with a pin 34 which latter is connected to pin 33 by means of a spring 35 so arranged that the support 28 may be swung to either of the two positions 28′ and 28″ shown in chain lines in Fig. 10.

It follows from the assembly just described that the support 28 may be completely swung around so as to assume either of two idle positions in opposite directions, both substantially perpendicular to the position assumed in operation, i. e. the position illustrated in full lines in Figs. 9 to 11.

The advantage of the arrangement just described is that, when the claw carrier is in position 28', it allows the rotation of turret T to be freely and easily effected whereas, when in position 28", the camera 4 having been separated from the grip, it permits the said camera to be more easily lodged in its case for transportation and is protected from impacts that would be liable to distort it were it to remain in the more vulnerable position 28.

It should further be noted that when the claw-carrier support is in position 28", the spring 35 constantly tends to restore it to the operation position 28 and thus will ensure a highly reliable and unfailing engagement of the release 5 of camera 4, owing to the fact that due to the very small clearance present between the shutter release 5 and the corresponding wall of camera 4, said spring 35 will not only automatically take up the said clearance, but will also take up any clearance that might on occasion occur between release 5 and support 28 in service position as a result of a defective mounting of the camera on the release grip.

For biasing the trigger 6 the latter is subjected to the action of a spring 36 which at one end takes support against the grip bracket 1 and at its other end against the said trigger, the said spring being passed around a pin 27 connecting the two-flanges 8 and 9 of bracket 1.

It should be observed that, in any one of the forms of embodiment described, since the claw may be disengaged from the camera release 5, it is possible to actuate the said release manually.

What I claim is:

1. In a photographic assembly including a camera having a revolving lens holder supporting more than one objective lenses thereon and rotatable to place a selected one of said lenses in operative relation to said camera, shutter means arranged for cooperation with said lens, a movable shutter release operatively connected with said shutter means for operating the latter, a camera support including a grip portion shaped to be conveniently grasped in one hand and means securing said camera to an upper portion of said support, a trigger displaceably connected to said support in a position to be displaced with a finger of said one hand, a guide member shiftable between an operative and an idle position, actuating means movably mounted on said member to be guided thereby and including a projection adapted to engage said release in the operative position of the guide member and to stand clear of said release in said idle position of the guide member, and means connecting said actuating means with said trigger whereby finger pressure on the trigger in said operative position of the guide member will move said actuating means to operate said shutter release, while shifting of said guide member to its idle position will permit unimpeded rotation of said lens holder.

2. In a photographic assembly including a camera having a revolving lens holder with more than one objective lenses thereon and rotatable to place a selected one of said lenses into operative relation with said camera, shutter means arranged for cooperation with said lenses, a shutter release operatively connected with said shutter means for operating the latter, a camera support including a grip portion shaped to be conveniently held in one hand and means securing the camera to said support, a trigger displaceably mounted on said support for manipulation with a finger of said one hand, a guide member pivoted on said support and rockable between an operative and an idle position, actuating means slidably mounted on said guide member to be guided thereby and including a projection adapted to engage said release in the operative position of the guide member and to stand clear of said release in said idle position of the guide member, and means connecting said actuating means with said trigger whereby finger pressure on the trigger in said operative position of the guide member will move said actuating means to operate said shutter release, while rocking of said guide member to its idle position will permit unimpeded rotation of said lens holder.

3. An assembly as claimed in claim 2, wherein said trigger is pivoted to said support.

4. An assembly as claimed in claim 2, wherein said trigger is pivoted to said support, and said connecting means comprise a flexible element having one end attached to said actuating means and its opposite end attached to said trigger.

5. An assembly as claimed in claim 2, wherein said trigger is pivoted to said support, said connecting means comprise a flexible cable element having one end attached to said actuating means and its other end attached to said trigger, roller means journalled on said support in a position to be engaged by said cable element for guiding and tensioning the latter, and means for adjusting the effective length of said cable element.

6. An assembly as claimed in claim 2, wherein said trigger is pivoted to said support, said guide member comprises a hollow cage having a longitudinal slot formed in a wall thereof directed towards said lens holder, said actuating member comprises a slider slidable in said cage and said projection projects from said slider through said slot into engagement with said shutter release.

7. In a photographic assembly including a camera having a revolving lens holder with more than one objective lenses thereon rotatable to position a selected one of said lenses in operative relation with said camera, shutter means arranged for cooperation with said lens, a shutter release operatively connected with said shutter means for operating the latter, a camera support including a grip portion shaped to be conveniently held in one hand and means securing the camera to said support, a trigger mounted on said support for vertical sliding movement relatively thereto and operable with a finger of said hand, a guide member pivoted to said trigger and rockable between an operative and an idle position, actuating means slidably mounted on said guide member to be guided thereby and including a projection adapted to engage said release in the operative position of the guide member and to stand clear of said release in the idle position of the guide member, means connecting said actuating means with said trigger whereby downward finger pressure on the trigger in said operative position of the guide member will move said actuating means to operate said shutter release, while rocking of said guide member to its idle position will permit unimpeded rotation of said lens holder.

8. An assembly as claimed in claim 7, wherein said guide member is pivoted to said trigger about a pivot axis substantially parallel to the optical axis of the camera for rocking movement in a transverse plane of said camera.

9. An assembly as claimed in claim 7, wherein said guide member is pivoted to said trigger about a pivot axis substantially normal to the optical axis of the camera for pivotal movement in a longitudinal plane of said camera.

10. An assembly as claimed in claim 7, wherein said guide member is pivoted to said trigger about a pivot axis substantially normal to the optical axis of the camera and is pivotable between an upstanding operative position and either of two oppositely directed idle positions substantially normal to said upstanding position.

11. In the assembly as claimed in claim 7, spring means urging said guide member to said operative position thereof.

12. In the assembly claimed in claim 7, first spring means biasing said trigger and guide member bodily upwards against said finger pressure, and further spring means biasing said guide member about its pivot towards said operative position thereof.

No references cited.